United States Patent Office 2,906,602
Patented Sept. 29, 1959

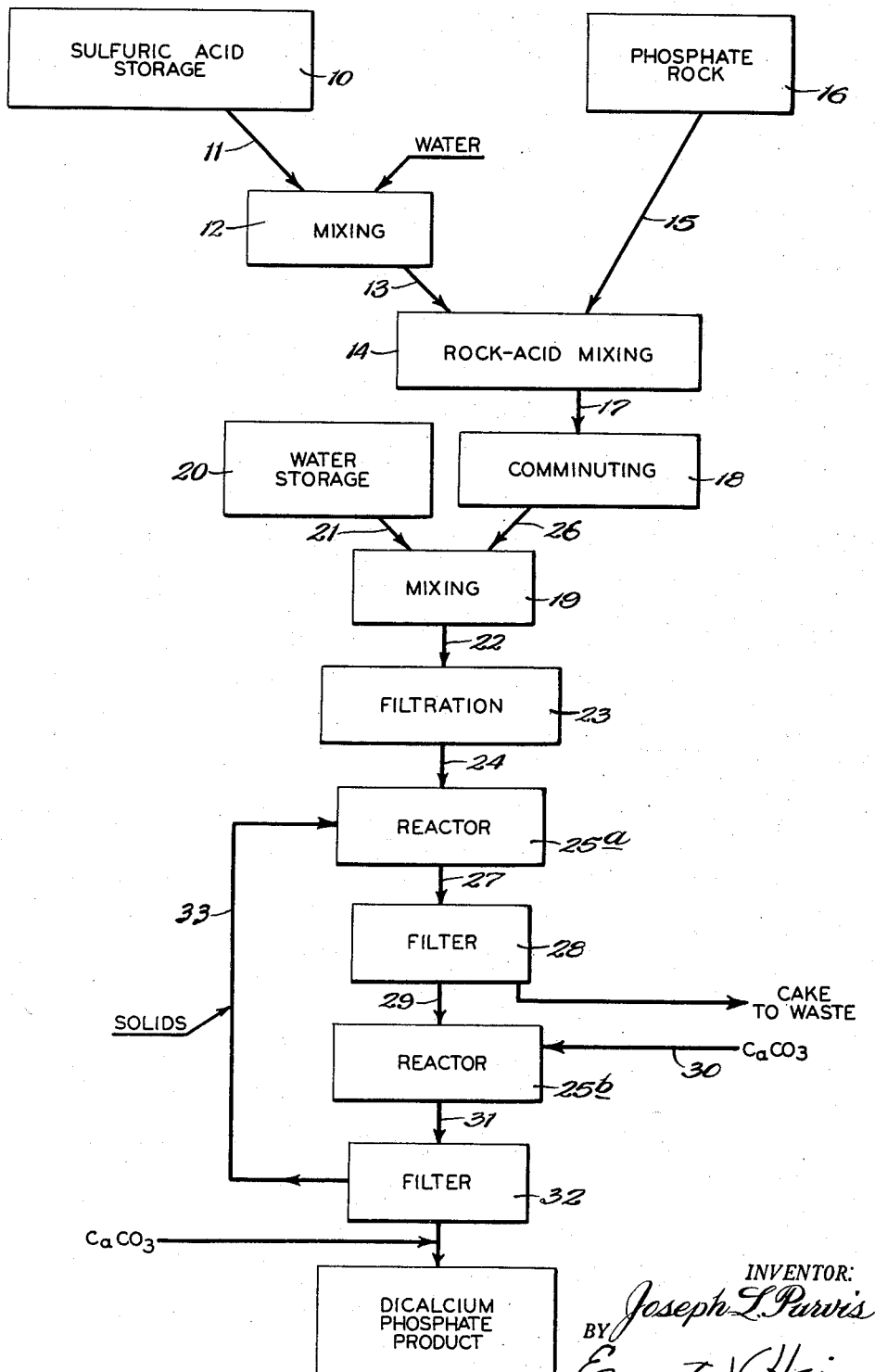

2,906,602

METHOD OF PREPARING CALCIUM PHOSPHATES

Joseph L. Purvis, Northbrook, Ill., assignor to International Minerals & Chemical Corporation, a corporation of New York Application December 6, 1954, Serial No. 473,166

6 Claims. (Cl. 23—109)

This invention relates to the production of monocalcium phosphate and dicalcium phosphate. More particularly it relates to the defluorination of phosphatic solutions such as phosphoric acid, monocalcium phosphate solutions, or mixtures thereof. Still more particularly it relates to a method of preparing animal feed grade dicalcium phosphate from fluorine-containing phosphate solutions.

In the production of phosphates from phosphate rock by the sulfuric acid method it has been the general practice to react ground phosphate with sulfuric acid in an amount sufficient to convert the phosphorus content to a predominantly monocalcium phosphate solution, i.e., a solution having a minor but appreciable quantity of phosphorus present as phosphoric acid. This solution is filtered to remove gypsum and is then subjected to purification steps to remove iron, aluminum, fluorine, and like contaminants. The purified solution is then reacted with lime or limestone to precipitate dicalcium phosphate.

Purification has proven an expensive step in the operation. Appreciable quantities of $P_2O_5$ are lost in the purification steps and are generally sold as fertilizer grade material, thus recovering little more than the cost of raw material and processing. Further, where limestone has been used to precipitate fluorides, etc., the quantity of limestone required for effective defluorination far exceeds the limestone based upon stoichiometrically equivalent weights for reaction.

It is a primary object of this invention to overcome the shortcomings and disadvantages of the process as heretofore known.

It is another object of this invention to provide an inexpensive process utilizing sulfuric acid for reaction with phosphatic rock components which recovers higher percentages of $P_2O_5$ than has been possible with sulfuric acid processes heretofore used.

It is still another object of this invention to provide simple, economical means for purifying phosphate solutions whereby larger quantities of $P_2O_5$ are converted to dicalcium phosphate suitable for incorporation in animal feed products.

It is still another object of this invention wherein the requirements of calcium carbonate for defluorination are reduced markedly. These and other objects will become apparent to those skilled in the art from the following description and from a study of the drawing which is a schematic representation of the processing steps.

Preferably, the improved process comprises reacting aqueous phosphatic solution with a predetermined quantity of calcium-bearing precipitant for fluorine in two stages in which the fresh precipitant contacts partially defluorinated liquor and the cake from this reaction stage is contacted with fresh phosphatic solution in a preliminary reaction step.

More in detail, the improved process reacts finely divided phosphate rock with sulfuric acid of predetermined dilution. A raw phosphatic rock material comprises essentially tricalcium phosphate or its mineral equivalent; for example, collophane or apatite of either high or low phosphatic content, which content usually falls in the range of approximately 30% to approximately 35% $P_2O_5$. The phosphatic source material is best utilized if it is finely ground, i.e., about 48% to about 80% being capable of passing through a 200 mesh standard screen. Less finely ground material may be used, but the subsequent acidulation requires a considerably longer time to achieve substantial as well as complete conversion. The finely ground material is allowed to react with sulfuric acid under constant and intensive agitation which is of short duration.

The time of mixing is preferably of the order of one to two minutes, which time is sufficient for thorough mixing and at the same time results in the formation of a porous, easily crushed mass of low bulk density. The temperature of the acid fed to the mixer is generally within the range of 65° C. to about 100° C.

The sulfuric acid mixed with finely ground rock may be of any convenient dilution; for example, about 50% to about 70% sulfuric acid corresponding to 40° Bé. to 55° Bé. It will, of course be understood that under special conditions concentrations of sulfuric acid higher than mentioned can be utilized. This acid is added to the ground phosphate rock in such a proportion that there will be present in the mix between about 101% and about 110% of the sulfuric acid theoretically required to convert all of the $P_2O_5$ present in the rock to monocalcium phosphate, allowing in addition enough acid to also react with the impurities such as iron, alumina, fluorine, and the like. The acid is preferably added as about 60% to about 69% sulfuric acid. The total quantity of acid need not be added all at the same time as a single addition, but may be partially added originally, and the remainder added during or before the subsequent leaching step. Those familiar with the sulfuric acid process will at once recognize that this process is more economical because it utilizes less concentrated acid and smaller amounts of excess acid for the highest recovery of $P_2O_5$ components from the rock. The highest recovery of water-soluble phosphorus values is achieved using about 65% to about 69% sulfuric acid. A maximum recovery is generally obtained using about 66% sulfuric acid with the mix being aged for about two weeks.

The acid mix has been found to set up in about fifteen to about twenty minutes with a dry mass which remains friable for indefinite periods of time. This acid mix, as initially formed, should constitute about 65% solids, but may range between about 45% and about 70% solids. The solidified mix is conveyed directly to succeeding processing steps or it is simply stored until such time as required.

The acid mix, either aged or green, is next subjected to a leaching and then a filtration operation. The acid mix is passed through suitable pulverizing apparatus, such as a hammer-mill, and the powdered product fed to a mixing tank in predetermined quantities where it is mixed with metered quantities of water or dilute monocalcium phosphate aqueous solution. The leaching operation may be carried out at temperatures in the range of about 72° C. to about 82° C. preferred, in order to reduce the viscosity of the solution and improve filtration, provided the mole ratio of $CaO/P_2O_5$ is below 0.7 to prevent formation of insoluble dicalcium phosphate precipitates.

The leaching operation is preferably carried out by the countercurrent flow of solids and liquids. Sufficient liquid leaching medium is added so that the resulting slurry contains between about 35% and about 40% solids, although more concentrated or more dilute slurries may be employed if desired. The agitation and slurrying is for a short period, of the order of about five to about fifteen minutes, either while hot or at atmospheric temperatures.

In the countercurrent operation, water or dilute monocalcium phosphate solution first contacts solids which have passed through successive mixing stages and separations to the last mixing stage. After contact with water, for example, the undissolved solids, after passage through the high concentrate filter, are conveyed to storage for further treatment in the initial acid treatment stages of the process. Rich liquor from the first filter stage of aged acid-mix or superphosphate leaching contains approximately 20% to approximately 35% dissolved solids, of which approximately 18% to approximately 22% is phosphate measured as $P_2O_5$ values. This solution, if the rock-acid mix has been aged, is of approximately 31° Bé. to approximately 34° Bé., and comprises essentially monocalcium phosphate and orthophosphoric acid. The separation of phosphatic solution and insoluble solids may be carried out in any convenient and conventional manner, such as, for example, by filtration, counter-current multistage centrifuging, or by use of liquid phase cyclone separators.

This extract solution is diluted to between about 10% and about 18% $P_2O_5$ content prior to reaction with a calcium-bearing reactant or precipitant for fluorine. Solution fed to this second reaction stage is filtrate recovered after separating insoluble material from the slurry produced in the first reaction stage. Cake from the second reaction stage is mixed with fresh extract in the first reactor stage. After reaction between these materials a slurry produced is separated and the solids discharged to waste or byproducts.

Addition of calcium-bearing reactant is made in quantities to produce a $CaO/P_2O_5$ mol ratio in the system in the range between about 0.80:1 and about 1.2:1, depending upon the amount of purification desired. For the purification of a predominantly monocalcium phosphate solution having a $CaO/P_2O_5$ mol ratio of about 0.6:1, about 3 pounds to about 8 pounds of calcium carbonate reactant or its equivalent, such as 1.5 pounds to 5 pounds of CaO, is added for defluorination.

After removal of the solids after the second stage reaction, the resultant solution in general will analyze 12% to 16% $P_2O_5$, 0.10% to 0.20% sulfate, 0.02% to 0.04% fluorine, 3% to 4.5% CaO, 0.02% to 0.04% $Al_2O_3$, and approximately 0.1% $Fe_2O_3$. Temperatures of the reacting mixture are maintained in the range of between about 40° C. and about 65° C.

According to the instant invention the extract solution is slurried with between about 90% and about 100% of the stoichiometric amount of calcium carbonate needed for precipitation of the impurities therein. This amount contrasts with the 150% to 200% of the stoichiometric amount of calcium carbonate needed for precipitation in the usual precipitation way. Following defluorination the resultant extract is slurried with sufficient calcium carbonate for precipitation of the $P_2O_5$ content as dicalcium phosphate. This precipitation reaction may be carried out at temperatures ranging from about 100° F. to about 212° F., but it is preferred that the reaction be at a temperature in the range between about 180° F. and about 210° F. in order to obtain as complete precipitation as possible.

In the attached flow sheet, sulfuric acid from a storage station 10 is delivered through conduit 11 to a mixing station 12. If the acid is of higher concentration than desired, it may be diluted with water. Dilute acid solution is conducted through pipe 13 to mixing station 14 where it contacts comminuted phosphate rock delivered by conveyor 15 from rock storage station 16. Acid mix from station 14 is delivered by conveyor 17 to a comminuting station 18. From station 18 the powdered mix is conveyed by belt 26 to a mixing station 19 where it is mixed with water delivered from storage station 20 through pipe 21 to form a slurry of approximately 30% solids concentration.

Slurry from mixing station 19 is delivered through conduit 22 to the filtration station 23. Filtrate is delivered from filtration station 23 through pipe 24 to reactor station 25a. Filtrate is mixed with filter cake delivered by belt conveyor 33. Slurry from reactor 25a is conveyed by pipe 27 to filter station 28. Filter cake from filter station 28 is delivered to waste. Filtrate from filter station 28 is delivered through pipe 29 to reactor station 25b. In reactor station 25b the filtrate is mixed with calcium carbonate delivered by conveyor 30 from a storage source not shown. Slurry from reactor 25b is delivered by pipe 31 to filter station 32. Filter cake from station 32 is delivered by means of belt conveyor 33 to reactor 25a, as explained hereinbefore. Defluorinated extract from filter station 32 is mixed with additional quantities of calcium carbonate to precipitate a dicalcium phosphate product.

The invention will be more fully understood from the following description which is given by way of explanation and without any intention of limiting the invention to the specfic conditions set forth.

EXAMPLE I

About 10 tons per hour of Florida phosphate rock was ground to a particle size, approximately 52% of which passes through a 200 mesh screen. This rock analyzed about 67% bone phosphate of lime. The ground rock was mixed with about 6 tons per hour of about 98% sulfuric acid added as 51° Bé. to 54° Bé. aqueous solution. The mixture was thoroughly agitated for about one minute, after which it was discharged onto a continuous belt provided with exhaust means for gases such as sulfur dioxide, silicon tetrafluoride, and the like, adjacent the point of discharge of slurry onto the belt. The belt length and its speed were such that the mixture remained on the belt about twenty minutes. The discharge from the belt was stored in a pile for about fourteen days.

The stored material was then removed from storage, broken up, and sufficient water added to give a slurry of about 35% undissolved solids. The slurry was subjected to four stages of continuous countercurrent decantation, followed by a final filtration, to produce a leach solution containing about 30% dissolved solids and being of approximately 32° Bé. gravity. The discarded tailings contain about 2.5% of the 30% total $P_2O_5$, only about one-half of which is available.

The above extract, which is a predominantly monocalcium phosphate solution containing a minor amount of free phosphoric acid, was diluted with water to produce an aqueous solution of approximately 12.5% $P_2O_5$, 3% CaO, and 0.45% fluorine content.

Portions of the above solution were treated individually as follows: the solution was introduced into a mixing chamber having stirring equipment for agitation purposes. Each portion was heated to approximately 55° C. To each portion of solution was added, for example, 12.5 parts by weight of $CaCO_3$ for each 400 parts by weight of solution. The slurry was agitated for 45 minutes and then filtered. The cake and the filtrate were analyzed to determine the defluorination and $P_2O_5$ losses.

Results obtained when adding various weights of $CaCO_3$ were as follows:

Table 1

| Amount of $CaCO_3$ per 400 parts of solution | P/F, weight ratio | Percent $P_2O_5$ by weight in cake | Percent of $P_2O_5$ of extract lost in cake |
| --- | --- | --- | --- |
| 12.5 | 89 | 36.3 | 10.3 |
| 15 | 126 | 39.4 | 14.1 |
| 25 | 197 | 26.4 | 15.4 |

EXAMPLE II

A portion of the above solution from Example I was treated with 12.5 parts by weight of $CaCO_3$ and filtered as in Example I to produce a filtrate having a weight ratio of phosphorus to fluorine of approximately 89. This filtrate was treated in a mixing chamber identical with that used in Example I with a second portion of $CaCO_3$ in the weight ratio of 12.5 parts of $CaCO_3$ per 400 parts by weight of filtrate. The treatment of the filtrate was at a temperature of approximately 55° C. and the slurry was agitated for 45 minutes. After 45 minutes, the slurry was filtered. The filter cake was mixed with a portion of fresh extract in the above mentioned 12.5 parts (dry weight) per 400 parts by weight of fresh extract.

After agitation of the cake-fresh extract slurry for 45 minutes, the slurry was filtered and the filter cake discarded. This second filtrate was next treated in the identical mixing equipment with 12.5 parts by weight of fresh $CaCO_3$ at a temperature of 55° C. for 45 minutes. This slurry was then filtered and the cake going to discard was analyzed for $P_2O_5$ content and the final filtrate analyzed for weight ratio of phosphorus to fluorine.

Results for processing using two different weight ratios of $CaCO_3$ were as follows:

*Table 2*

| Amount of $CaCO_3$ per 400 parts of solution | P/F, weight ratio | Percent $P_2O_5$ by weight in cake | Percent of $P_2O_5$ of extract lost in cake |
|---|---|---|---|
| 12.5 | 185 | 40.5 | 14.8 |
| 15 | 230 | 41.6 | 15.7 |

Comparison of the results shown in Tables 1 and 2 show that for the corresponding weight of $CaCO_3$ in each instance, the two stage operation affects a markedly more complete defluorination and shows a $P_2O_5$ loss which is substantially the same.

EXAMPLE III

About 10 tons per hour of Florida phosphate rock was ground to a particle size approximately 52% of which passes through a 200 mesh screen. This rock analyzed about 67% bone phosphate of lime. The ground rock was mixed with about 6 tons per hour of about 98% sulfuric acid added as 51° Bé. to 54° Bé. aqueous solution. The mixture was thoroughly agitated for about one minute, after which it was discharged onto a continuous belt provided with exhaust means for gases adjacent the point of discharge of slurry onto the belt. The belt length and its speed was such that the mixture remained on the belt for about 20 minutes. The green or unaged mix was delivered from the belt directly to a counter-current decantation operation to produce a leach solution containing approximately the same percentage of discharge solids as the extract from the aged superphosphate of Example I.

The extract obtained by leaching green super is a predominantly phosphoric acid solution containing a minor amount of monocalcium phosphate. This extract was diluted with water to produce a phosphoric acid solution of approximately 15.7% $P_2O_5$, 2.05% CaO, and 1.0% fluorine content.

400 parts of the phosphoric acid solution was treated with 15 parts by weight of $CaCO_3$ and filtered as in Example I to produce a filtrate having a weight ratio of phosphorus to fluorine of approximately 10. This filtrate was treated in a mixing chamber identical with that used in Example I with a second portion of $CaCO_3$ in the weight ratio of 25 parts of $CaCO_3$ per 400 parts by weight of filtrate. The treatment of the filtrate was at a temperature of approximately 55° C. and the slurry was agitated for 45 minutes. After 45 minutes, the slurry was filtered. The filter cake was mixed with 400 parts fresh extract.

After agitation of the cake-fresh extract slurry for 45 minutes, the slurry was filtered and the filter cake discarded. This second filtrate was next treated in the identical mixing equipment with 25 parts by weight of fresh $CaCO_3$ at a temperature of 55° C. for 45 minutes. This slurry was then filtered and the cake going to discard was analyzed for $P_2O_5$ content and the final filtrate analyzed for weight ratio of phosphorus to fluorine.

Results for processing using two different weight ratios of $CaCO_3$ were as follows:

*Table 3*

| Amount of $CaCO_3$ per 400 parts of solution | P/F, weight ratio | Percent $P_2O_5$ by weight in cake | Percent of $P_2O_5$ of extract lost in cake |
|---|---|---|---|
| 25 | 202 | 45.9 | 14.8 |
| 20 | 96 | 45.0 | 7.0 |

Having thus fully described and illustrated the character of the invention, what is desired to be secured and claimed by Letters Patent is:

1. A process for preparing a defluorinated aqueous monocalcium phosphate solution which comprises reacting phosphate rock with sulfuric acid in proportions to produce superphosphate, leaching the superphosphate with aqueous solution to produce a predominantly monocalcium phosphate solution, adjusting the $P_2O_5$ content of the solution to an amount in the range between about 10% and about 18% $P_2O_5$, adding to this solution in a first reaction stage the defluorination cake from the reaction of partially defluorinated solution and calcium carbonate, separately recovering a solid phase material of high fluorine content and a partially defluorinated phosphatic solution, adding to the partially defluorinated phosphatic solution fresh calcium carbonate in amounts such as to produce in the system a $CaO/P_2O_5$ mol ratio in the range between about 0.8:1 and about 1.2:1, and separately recovering a solids cake for use in the first reaction stage and an aqueous phosphatic solution of low fluorine content.

2. A defluorination process which comprises adding to an untreated fluorine-containing aqueous phosphatic solution in a first reaction stage slurry solids from the reaction of partially defluorinated phosphatic solution and a calcium-bearing precipitant obtained from a subsequent reaction stage, reacting the resulting mixture, separately recovering from the reaction product a solid-phase material of high fluorine content and a partially defluorinated phosphatic solution, adding to the partially defluorinated phosphatic solution in a second reaction stage fresh calcium-bearing precipitant in sufficient amount to give a $CaO/P_2O_5$ molar ratio of at least 0.6:1 in the system but without substantial dicalcium phosphate precipitation, reacting the resulting mixture, separately recovering from the reaction product an aqueous phosphatic solution of low fluorine content and slurry solids containing unreacted calcium-bearing precipitant, and recycling said slurry solids to said first reaction stage for partial defluorination of untreated fluorine-containing phosphatic solution.

3. A process as in claim 2 wherein calcium-bearing precipitant is added in said second reaction stage in an amount such as to produce in the system a $CaO/P_2O_5$ molar ratio in the range between about 0.8:1 and about 1.2:1.

4. A process as in claim 2 wherein said partially defluorinated phosphatic solution has a $P_2O_5$ content in the range between about 10 and about 18% by weight.

5. A process as in claim 2 wherein said calcium-bearing precipitant is calcium carbonate.

6. A process as in claim 2 wherein the mixture in each of said reaction stages is reacted at a temperature between about 40 and about 65° C. for a period of about 30 to about 45 minutes.

References Cited in the file of this patent

UNITED STATES PATENTS

| | | |
|---|---|---|
| 418,259 | Winssinger | Dec. 31, 1889 |
| 1,851,210 | Palazzo et al. | Mar. 29, 1932 |
| 2,013,970 | Moore | Sept. 10, 1935 |
| 2,115,150 | Seyfried | Apr. 26, 1938 |
| 2,164,627 | Seyfried | July 4, 1939 |
| 2,312,047 | Ogburn | Feb. 23, 1943 |
| 2,567,227 | Miller | Sept. 11, 1951 |
| 2,722,472 | LeBaron | Nov. 1, 1955 |
| 2,759,795 | Archer | Aug. 21, 1956 |